US010690849B2

(12) United States Patent
Lipson et al.

(10) Patent No.: US 10,690,849 B2
(45) Date of Patent: Jun. 23, 2020

(54) INTEGRATED MICRO-LENS WAVEGUIDE AND METHODS OF MAKING AND USING SAME

(71) Applicant: The Trustees of Columbia University in the City of New York, New York, NY (US)

(72) Inventors: Michal Lipson, New York, NY (US); Mohammad Amin Tadayon, Bronx, NY (US); Aseema Mohanty, New York, NY (US); Felippe Barbosa, Campinas (BR)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 15/614,937

(22) Filed: Jun. 6, 2017

(65) Prior Publication Data

US 2017/0351026 A1     Dec. 7, 2017

Related U.S. Application Data

(60) Provisional application No. 62/345,975, filed on Jun. 6, 2016.

(51) Int. Cl.
*G02B 6/12* (2006.01)
*G02B 6/13* (2006.01)
(Continued)

(52) U.S. Cl.
CPC ........... *G02B 6/1245* (2013.01); *G02B 1/045* (2013.01); *G02B 6/1221* (2013.01); *G02B 6/136* (2013.01);
(Continued)

(58) Field of Classification Search
CPC ............... G02B 6/12; G02B 6/13; G02B 6/24
(Continued)

(56) References Cited

U.S. PATENT DOCUMENTS 5,747,796 A * 5/1998 Heard ............... G02B 6/06
250/227.2
5,905,836 A * 5/1999 Arai ............... G02B 6/4249
385/116

(Continued)

FOREIGN PATENT DOCUMENTS

WO   WO 2016/060623 A1   4/2016
WO   WO 2016/086003 A1   6/2016
(Continued)

OTHER PUBLICATIONS

Boyden, E.S., et al., "Millisecond-timescale, genetically targeted optical control of neural activity," Nature neuroscience, 8.9(2005): 1263-1268.
(Continued)

*Primary Examiner* — Kaveh C Kianni
(74) *Attorney, Agent, or Firm* — BakerHostetler (57) ABSTRACT

A probe structure includes a monolithically integrated waveguide and lens. The probe is based on SU-8 as a guiding material. A waveguide mold is defined using wet etching of silicon using a silicon dioxide mask patterned with 45° angle with respect to the silicon substrate edge and an aluminum layer acting as a mirror is deposited on the silicon substrate. A lens mold is made using isotropic etching of the fused silica substrate and then aligned to the silicon substrate. A waveguide polymer such as SU-8 2025 is flowed into the waveguide mask+lens mold (both on the same substrate) by decreasing its viscosity and using capillary forces via careful temperature control of the substrate.

10 Claims, 7 Drawing Sheets

(51) Int. Cl.
G02B 6/24 (2006.01)
G02B 6/124 (2006.01)
G02B 6/136 (2006.01)
G02B 6/122 (2006.01)
G02B 1/04 (2006.01)

(52) U.S. Cl.
CPC .... *G02B 6/241* (2013.01); *G02B 2006/12176* (2013.01)

(58) Field of Classification Search
USPC .......................................................... 385/42
See application file for complete search history.

(56) References Cited

U.S. PATENT DOCUMENTS

| | | | | |
|---|---|---|---|---|
| 6,647,184 | B2* | 11/2003 | Ukechi | G02B 6/29368 385/45 |
| 7,421,160 | B1* | 9/2008 | Budd | G02B 6/30 385/129 |
| 7,522,801 | B2* | 4/2009 | Makita | G02B 6/42 385/129 |
| 7,574,081 | B2* | 8/2009 | Miyadera | G02B 6/2813 385/1 |
| 9,089,667 | B2 | 7/2015 | Bankiewicz | |
| 2003/0035632 | A1* | 2/2003 | Glebov | G02F 1/31 385/43 |
| 2004/0247236 | A1* | 12/2004 | Yoshimura | G02B 6/12002 385/16 |
| 2005/0201715 | A1* | 9/2005 | Ellwood, Jr. | G02B 6/2746 385/147 |
| 2006/0008199 | A1* | 1/2006 | Glebov | G02B 6/322 385/15 |
| 2006/0263003 | A1* | 11/2006 | Asai | G02B 6/4204 385/14 |
| 2010/0027946 | A1* | 2/2010 | Dutta | G02B 6/12002 385/88 |
| 2010/0135619 | A1* | 6/2010 | Choi | G02B 6/12007 385/88 |
| 2015/0117824 | A1* | 4/2015 | Wang | G02B 6/32 385/93 |

FOREIGN PATENT DOCUMENTS

WO WO 2016/086412 A1 6/2016
WO WO 2016/090302 A1 6/2016

OTHER PUBLICATIONS

Packer, Adam M., et al., "Targeting neurons and photons for optogenetics," Nature neuroscience 16.7 (2013): 805-815.
Zorzos, AN, et al.in "Multi waveguide implantable probe for light delivery to sets of distributed brain targets," Optics letters, 35.24(2010):4133-4135.
Zhang, P., et al. "Microlens fabrication using an etched glass master," Microsystem Technologies, 13.3-4 (2007): 339-342.
Resnik, D., et al. in "The role of Triton surfactant in anisotropic etching of {I I 0} reflective planes on (1 0 0) silicon," Journal of Micromechanics and Microengineering, I5.6 (2005), p. 1174-1183.
Li, J., Taylor, A, Papakonstantinou, I., Zhang, E., & Beard, P. in (Mar. 2014), "Highly sensitive optical microresonator sensors for photoacoustic imaging" In SPIE BiOS (pp. 89430C-89430C), International Society for Optics and Photonics, Mar. 2014, 11 pages.
Barretto et al., "Time-lapse imaging of disease progression in deep brain areas using fluorescence microendoscopy", Nat Med., Feb. 2011, 17(2), 223-228.
Chen et al., "Endoscope lens with dual fields of view and resolutions for multiphoton imaging", Opt Lett., Aug. 2011, 35(16), 2735-2737.
Kwon et al., "Integrated multi-LED array with three-dimensional polymer waveguide for optogenics", MEMS, Jan. 20-24, 2013, 1017-1020.
Montgomery et al., "Wirelessly powered, fully internal optogenetics for brain, spinal and peripheral circuits in mice", Nature Methods, Oct. 2015, vol. 12, Issue 10, 969-974.
Tadayon et al., "Integrated Nanophotonic Platform for High Bandwidth and High Resolution Optogenetic Excitation", CLEO, OSA Technical Digest, 2016, paper ATu4O.4, 2 pages.
Deisseroth, "Channel structure-based tools for precise interrogation of circuitry and behavior", NIH Grant # 4R01MH075957-09, https://projectreporter.nih.gov/project_info_description.cfm?aid=8966565&icde=29875722, date accessed Jun. 25, 2019, 1 page.

* cited by examiner

ID MICRO-LENS WAVEGUIDE
INTEGRATED MICRO-LENS WAVEGUIDE AND METHODS OF MAKING AND USING SAME

CROSS-REFERENCE TO RELATED APPLICATIONS

This application claims priority to U.S. Provisional Patent Application Ser. No. 62/345,975, filed Jun. 6, 2016, the contents of which are hereby incorporated by reference in its entirety.

TECHNICAL FIELD

A monolithically integrated waveguide and lens and method of making same are described for applications including deep tissue imaging with high resolution and improved field of view.

BACKGROUND

Today the main method for deep tissue imaging is endoscopy using fibers or grin lenses. The disadvantage of these methods is their poor resolution and very large size. They are also limited to very specific shapes. Also, because these GRIN lenses have a relatively low index contrast, their field of view (FOV) is usually much smaller than their actual size. For example, for a 2 mm GRIN lens, the FOV is only a few hundreds of microns. A device for deep tissue imaging with high resolution and better FOV is desired.

Optogenetics, a biological technique that uses light to excite and inhibit neurons, has revolutionized research in neuroscience (see Boyden, E. S., et al., "Millisecond-timescale, genetically targeted optical control of neural activity," Nature neuroscience, 8.9 (2005): 1263-1268). At present, however, most applications of optogenetics employ a single optical fiber to flood a large area of the brain with light, which limits the ability to control and monitor single neurons. Optical microscopy techniques can alleviate this problem for areas of the brain close to the surface (see Packer, Adam M., et al., "Targeting neurons and photons for optogenetics," Nature neuroscience 16.7 (2013): 805-815). However, single neuron targeting using such techniques deep in the brain remains a challenge due to the large scattering of light.

On-chip waveguides could enable monolithic integration of light with traditional electrical probes and the manipulation of light through filtering and routing in order to control single neurons in deep regions of brain, which are not accessible with microscopic techniques. Furthermore, on chip waveguides can be implanted chronically in behaving animals, which is impossible to do by optical microscopy. On-chip waveguides for optogenetic applications have recently been demonstrated by Zorzos, A N, et al. in "Multiwaveguide implantable probe for light delivery to sets of distributed brain targets," Optics letters, 35.24 (2010): 4133-4135. However, most of on-chip platforms suffer fundamentally from low resolution and poor bandwidth. On-chip waveguides also rely on high index contrast materials such as for example SiN/SiO2 and are therefore limited to small cross sectional dimensions. This leads to high beam divergence of light exiting from the waveguides. In addition, several of the platforms demonstrated are highly dispersive and wavelength sensitive and therefore cannot be applied to applications requiring high bandwidth such as nonlinear excitation and simultaneous neural excitation using distinct wavelengths.

A device for deep tissue imaging with high resolution and better FOV, for optogenetic excitation, and for other related applications is desired.

SUMMARY

A polymeric waveguide with a micro-lens is fabricated for use in applications including deep tissue imaging, optogenetic excitation, and the like.

In exemplary embodiments, a probe structure is provided that includes a monolithically integrated waveguide and lens. The probe may be based on SU-8 or other polymer as a guiding material. The probe is fabricated using a waveguide mold and a lens mold. The waveguide mold may be defined using wet etching of silicon using a silicon dioxide mask patterned with an angle (e.g., a 45° angle) with respect to the substrate (e.g., silicon) edge and an aluminum or other reflective layer acting as a mirror is deposited on the substrate. The lens mold may be made using isotropic etching of a fused silica substrate and then aligned to the substrate. A polymer, e.g., SU-8 2025, is flowed into the waveguide mask/lens mold (both on the same substrate) by decreasing its viscosity and using capillary forces via careful temperature control of the substrate. Cross sectional dimensions of 100×100 µm² are chosen to ensure low dispersion as well as low interaction of the mode with the aluminum layer. The lens numerical aperture of 0.25, focal length of about 175 µm, and spot size of about 1.6 µm are achieved considering the lens dimensions. The flow and temperature of the polymer may be controlled such that the lens and waveguide are essentially monolithic with one another, as described elsewhere herein and as shown in, e.g., FIG. 1A and FIG. 7A.

In alternative embodiments, a negative lens is formed by using the lens mold to form a polymeric convex lens structure and using the convex lens structure as a mold to make a negative lens. Also, any micro-lens available on the market may be attached to a fused silica substrate, which is then used with the attached lens for making a new polymeric mold to replicate exactly similar geometry. The attached micro-lens may use different polymers with different refractive indices. Lenses may be printed on the waveguide using inkjet printing techniques.

The resulting monolithically integrated waveguide with micro-lens replaces existing fibers and GRIN lenses to provide a much higher resolution and FOV. Because of its high refractive index, the disclosed lenses have a comparatively high Numerical Aperture and, as a result, a comparatively high resolution. Further, the field of view relative to the actual size of the waveguide is comparatively large. In imaging applications, ultra-high resolution imaging is only limited by the size of the waveguide (<2 micron resolution) for a large field of view (>100×100 microns²).

In other embodiments, a cascade of micro-lenses and extended waveguide can be used to increase the length of the probe. In such a configuration, each of the lens/waveguides works like a half period of the Graded Refractive Index (GRIN) lens. Some of these micro-lenses can be combined with some other lenses for aberration correction. In this case, a very small lens probe with a very long waveguide is provided. This embodiment thus achieves a higher quality image with a better resolution and larger field of view than is available with conventional GRIN lenses.

In yet other embodiments, a cascade of lenses and mirrors may be used on the same waveguide to image at different depths. Replacing mirrors by the filters and utilizing wavelength dividing/multiplexing techniques in this case can significantly decrease the background noise and increase the contrast.

The integrated waveguide with micro-lens as so described is used in exemplary embodiment to image deep tissue by implanting the monolithically integrated waveguide with integrated micro-lens into deep tissue of a live animal, inserting light into a distal end of the waveguide, focusing the light on an object of interest using the integrated micro-lens, and imaging light reflected off the object of interest.

In exemplary embodiments, the monolithically integrated waveguide with integrated micro-lens is fabricated by:

etching a silicon substrate with a rectangular pattern mask having a 45° angle at a proximal end with respect to an edge of the silicon substrate;

depositing a layer of aluminum on the proximal end of the silicon substrate so as to function as a mirror;

aligning a lens mold having at least one semispherical pattern to the silicon substrate;

using a holder to align and hold together the lens mold and the silicon substrate with each other;

using capillary forces, flowing a negative photoresist polymer for the lens and waveguide material between the aligned silicon substrate and lens mold by decreasing a viscosity of the polymer via temperature control of the silicon substrate;

exposing the negative photoresist polymer between the silicon substrate and lens mold from a mold side;

releasing the lens mold; and developing an integrated lens-waveguide device using a developer for the polymer.

In exemplary embodiments of the manufacturing method, the etching comprises exposing an area of the silicon substrate to be etched to a solution of 25% Tetramethylammonium hydroxide (TMAH) mixed with 10-50 ppm Trionx100 at about 90° C. Also, exemplary embodiments of the silicon substrate have a 45° step in a silicon {111} plane and the aluminum deposited thereon forms a mirror to deflect incident light by 90°. The micro-lens may further comprise polymers having different refractive indices ranging from 1.3 to 1.7.

In other embodiments, a negative lens may be formed by using the lens mold to form a polymeric convex lens structure and using the convex lens structure as a mold to make a negative lens.

In still other embodiments, a micro-lens is attached to a fused silica substrate, and the fused silica substrate with the attached lens is used for making a new polymeric mold to replicate exactly similar geometry as the attached micro-lens for different polymeric lenses with different refractive indices.

BRIEF DESCRIPTION OF THE DRAWINGS

The above and other objects and advantages of the invention will be apparent to those skilled in the art based on the following detailed description in conjunction with the appended figures, of which.

DETAILED DESCRIPTION OF ILLUSTRATIVE EMBODIMENTS

An exemplary embodiment of a fabrication process for creating monolithically integrated waveguide probes is described below with respect to FIGS. 1-10. Those skilled in the art will appreciate that the steps described are for exemplary purposes only and are not limited to the specific process described. Moreover, certain well-known details are not set forth in the following disclosure to avoid unnecessarily obscuring the various embodiments of the invention. Those of ordinary skill in the relevant art will understand that they can practice other embodiments of the invention without one or more of the details described below. Also, while various methods are described with reference to steps and sequences in the following disclosure, the description is intended to provide a clear implementation of embodiments of the invention, and the steps and sequences of steps should not be taken as required to practice the invention.

Figure 1:
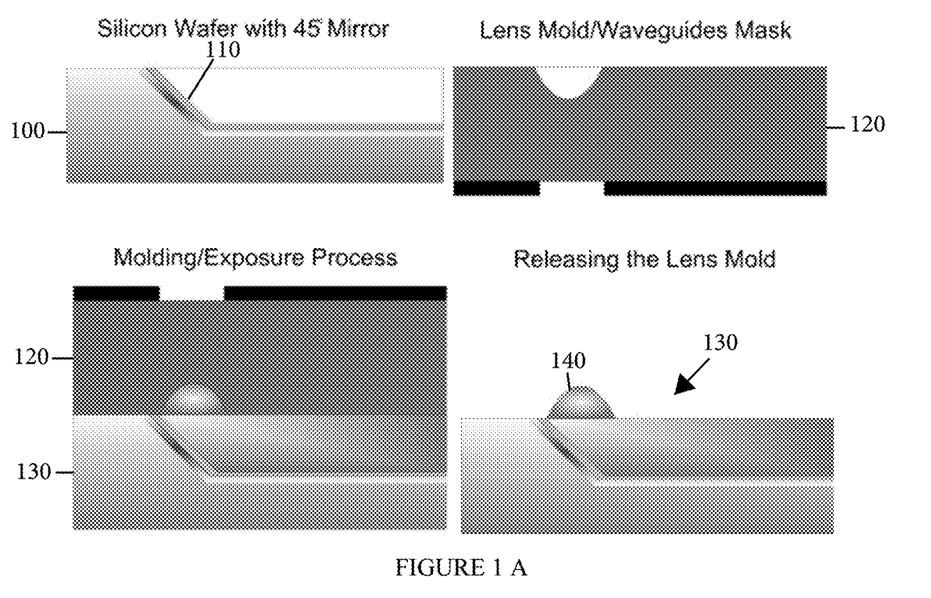
FIG. 1A illustrates an exemplary embodiment of an SU-8 waveguide and lens fabricated on a silicon substrate in accordance with the invention.
FIG. 1B illustrates an alternate embodiment in which a second lens at least partially surmounts the first lens to correct any type of aberration.

Probe Fabrication Method:

FIG. 1A illustrates an exemplary embodiment where a probe structure is based on SU-8 as a guiding material. A waveguide (cross section: 100 μm×100 μm) mold is defined using wet etching of silicon using a silicon dioxide mask patterned with a 45° angle with respect to the silicon substrate edge as described by Resnik, D., et al. in "The role of Triton surfactant in anisotropic etching of {1 1 0} reflective planes on (1 0 0) silicon," Journal of Micromechanics and Microengineering, 15.6 (2005), p. 1174 (FIG. 1A, upper left). An aluminum layer 110 acting as a mirror is deposited on the silicon substrate 100. A lens mold (FIG. 1A, upper right) is made using isotropic etching of a fused silica substrate 120 as described by Zhang, P., et al. "Microlens fabrication using an etched glass master," Microsystem Technologies, 13.3-4 (2007): 339-342, and then aligned to the silicon substrate (FIG. 1A, lower left). A waveguide polymer such as SU-8 2025 is then flowed into the waveguide and mask/lens mold (both on the same substrate) by decreasing its viscosity using capillary forces via careful temperature control of the substrate. The resulting structure 130 is shown in FIG. 1A, lower right, after the lens mold is removed. Cross-sectional dimensions of >100×100 microns² are chosen to ensure low dispersion as well as low interaction of the mode with the aluminum layer (COMSOL simulations show losses <<0.1 dB/cm). The lens numerical aperture of 0.25, focal length of about 175 and a spot size of about 1.6 microns are achieved using these lens dimensions.

An SU-8 waveguide (cross section: 100 µm×100 µm) and lens with a curvature radius of 40 µm (however, the lens is not completely semispherical after fabrication) are fabricated on a silicon substrate with a 45° step (in silicon {111} plane). A p-type {100} silicon substrate coated with 800 nm of silicon dioxide is also provided that works as a mask for later etching of the silicon substrate. This silicon dioxide rectangular pattern mask is made with a 45° angle with respect to the substrate edge. The silicon area to be etched is exposed to a solution of 25% Tetramethylammonium hydroxide (TMAH) mixed with 10-50 ppm Trionx100 at 90° C. in a manner such as that described by Resnik, Drago, et al. in "The role of Triton surfactant in anisotropic etching of {1 1 0} reflective planes on (1 0 0) silicon," Journal of Micromechanics and Microengineering 15.6 (2005): 1174. After etching of the silicon substrate, the silicon dioxide mask is removed and 200 nm aluminum layer which works as a mirror to deflect incident light by 90° is deposited on the silicon substrate.

The lens mold and the waveguide mask are made on a fused silica substrate. The lens mold is made by making small circles on 30 nm Cr: 200 nm Au: 1400 nm Shipley 1818 film to form a hard mask on the fused silica substrate in a manner such as that described by Zhang, P., et al. in "Microlens fabrication using an etched glass master," Microsystem technologies 13.3-4 (2007): 339-342. Next, a solution of 49% HF:DI (1:1) solution is used to make the lens mold with semispherical patterns of about 40 µm radius. After removal of the hard mask, a chromium mask which has the waveguide pattern is aligned with the mold and made on the back side of the same substrate. The lens mold is treated in fluoroctatrichlorosilane (FOTS) to avoid stiction of the polymer to the mold in subsequent steps.

The lens mold and the silicon substrate are aligned with each other and held together with a holder. Then the fixed mold and substrate are left on a hotplate with SU-8 2025. The temperature of the hotplate is gradually increased from 45° C. to 95° C. in about 30 minutes. Because of the increase of the temperature, viscosity of SU-8 2025 gradually decreases and the polymer start to flow into any gaps between the mold and substrate due to the capillary effect. To avoid the cracks and rupture of the waveguides after exposure, every 10-15 minutes the temperature of the hot plate is decreased by 10-15° C. to room temperature. Finally, the substrate and mold are exposed from the mold side, the mold is released, and the SU-8 waveguide/lens is developed in an SU-8 developer to remove any waste. The result is a monolithically integrated waveguide 130 having an integrated micro-lens 140.

In some embodiments, the lens 140 and waveguide 130 are comprised of the same polymeric material. This is not a requirement, however, as the lens 140 and waveguide 130 may comprise different polymeric materials with the same or different refractive indices.

Also, the waveguide 130 and lens 140 may be arranged so that the reflective surface is disposed opposite the lens 140. The reflective surface may be selected and/or angled such that the reflective surface is characterized as being wavelength-insensitive.

Figure 1B:
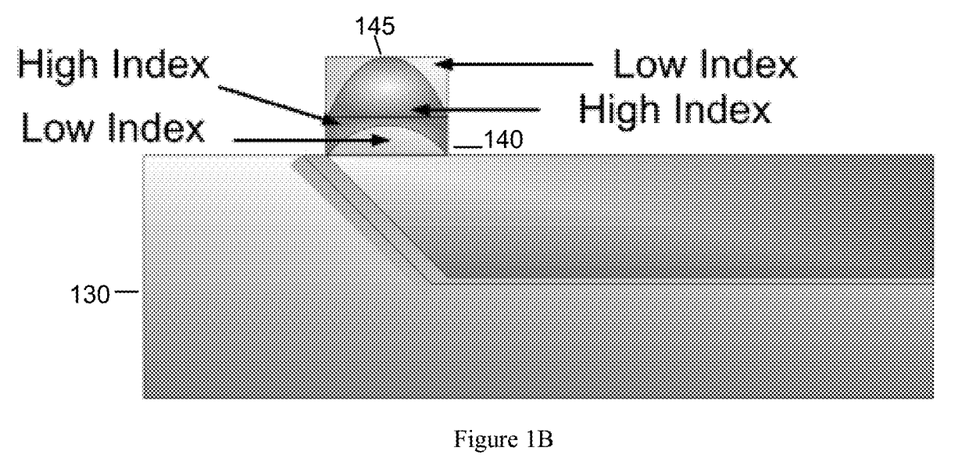

In exemplary configurations, the lens 140 has a major axis that is essentially perpendicular to a surface of the waveguide. As an example, the lens 140 may protrude essentially perpendicularly from an upper surface of the proximal end of the waveguide 130 as shown in FIG. 1A. As shown in FIG. 1B, a second lens 145 may also be used that at least partially surmounts the first lens 140 to correct any type of aberration.

Figure 2:
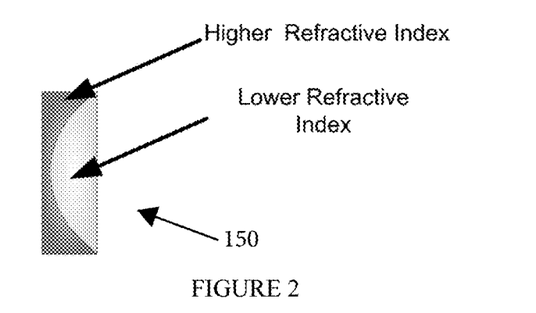
FIG. 2 illustrates an alternate embodiment where the lens polymer is replaced with polymers having different refractive indices.
Figure 3:
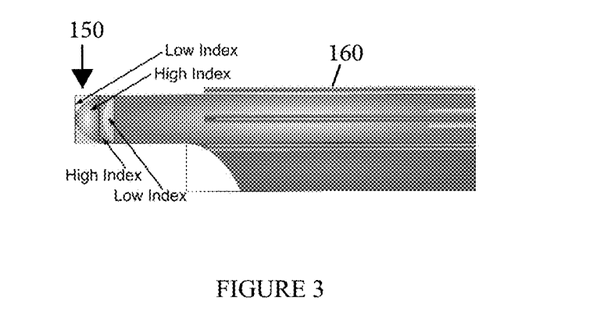
FIG. 3 shows the lens of FIG. 2 on a waveguide.

Alternate Embodiment:

FIG. 2 illustrates an alternate embodiment where the lens polymer is replaced with polymers having different refractive indices. In this embodiment, the higher the index of refraction of the waveguide, the higher the FOV. In an exemplary embodiment, an index of refraction of 1.56 (SU-8) is used. In principle, one could use polymers with different refractive indices from 1.3 to 1.7. FIG. 3 shows the lens 150 of FIG. 2 on a waveguide 160.

In yet another embodiment, a negative lens may be made using different lens material. The negative lens is formed by using the lens mold to form a polymeric convex lens structure and using the convex lens structure as a mold to make a negative lens. Also, a micro-lens may be attached to a fused silica substrate which is used with the attached lens for making a new polymeric mold to replicate exactly similar geometry. The attached micro-lens may use different polymers with different refractive indices. Thus, different available discrete lenses with different profiles may be used to make a lens mold and to make an integrated lens with exactly the same profile. An anti-stiction layer is deposited on the lens which already exists. In the same way, one may use the lens from a negative profile to develop any available lens profile with different refractive index.

In yet another embodiment, an inkjet printing method may be used to develop the lens 150 on top of the waveguide 160 in the manner described by way of example by Li, J., Taylor, A., Papakonstantinou, I., Zhang, E., & Beard, P. in (2014, March), "Highly sensitive optical microresonator sensors for photoacoustic imaging" In SPIE BiOS (pp. 89430C-89430C), International Society for Optics and Photonics, March 2014.

Figure 4:
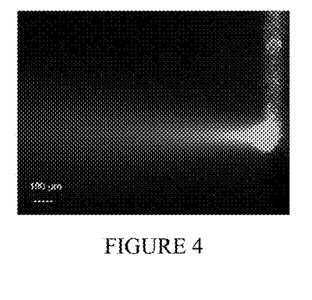
FIG. 4 illustrates a side view of the probe focusing ability inside a fluorescent dye.

Exemplary Results:

After bonding an exemplary probe to the optical fiber, the coupling losses and propagation losses (very small) of the probe is on the order of 10 dB using a 473 nm laser source (the main). In order to demonstrate the lens operation, the optical waveguide was embedded in a fluorescent dye solution (19.6 µM Alexa Flour 647 solution) in water at a wavelength of 645 nm. FIG. 4 illustrates a side view of the probe focusing ability inside the fluorescent dye. A focal point is provided at approximately 175 µm as shown in FIG. 4 which is on the order of the estimated focal length based on the measured lens dimensions.

As described below, the polymeric waveguide with the micro-lens as described above may be used in imaging applications. Because of the high refractive index, the lens has a very high Numerical Aperture. As a result, its resolution is very high and the FOV relative to the actual size of the waveguide is very large.

Ultra-High Resolution Imaging Embodiment

Figure 6:
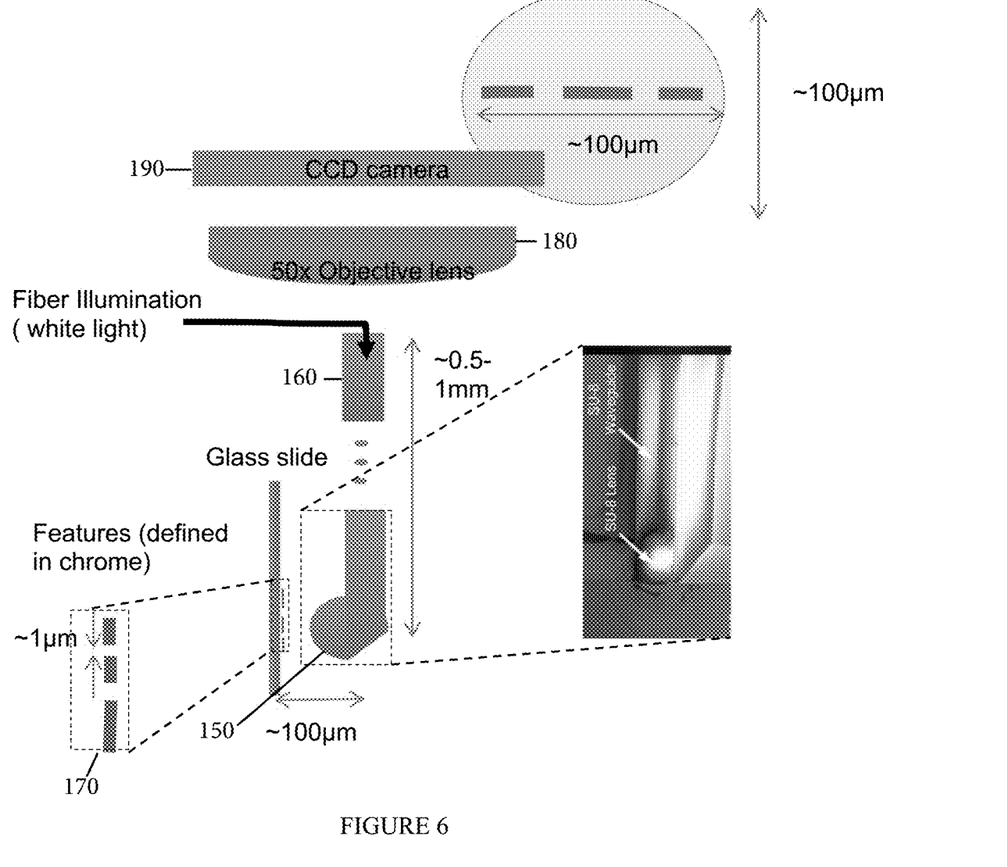
FIG. 6 illustrates a microphotonic platform for testing the performance of the waveguide and lens of FIG. 1A.

In order to demonstrate that the probe described herein may provide an ultra-high resolution image that is only limited by the size of the waveguide (<2 micron resolution) while providing a large field of view (>100×100 micron²), the imaging setup of FIG. 6 was provided. As illustrated, white light is sent through the waveguide 160 from a distal end to the lens for illumination of the object of interest. The reflected light off of the object is imaged. In the illustrated example, the object consists of lithographically defined patterns 170 defined on a glass slide. The working distance between the object and the lens is about 100 microns. A 50× objective lens is used to capture the image onto a CCD camera 190.

Figure 5:
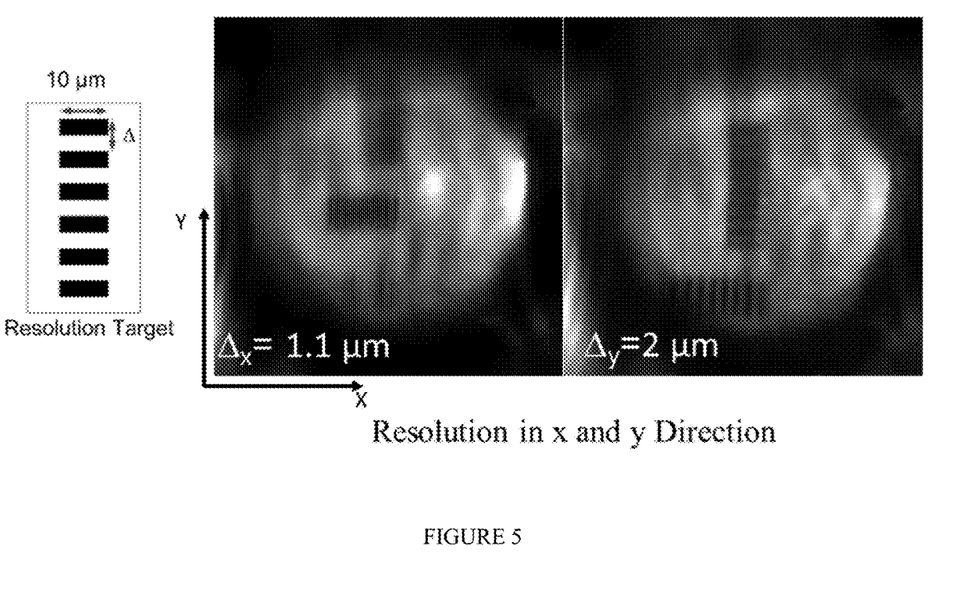
FIG. 5 illustrates examples of images obtained using the waveguide and lens of FIG. 1A on a microphotonic platform.

The sample was imaged with feature size of 0.7-10 um which was fabricated on the Aluminum mask. FIG. 5 shows examples of the images obtained using the from the micro-photonic platform of FIG. 6. As illustrated, the resolution that is obtained is 2 microns in one direction and 1.1 um in the other direction. By removing the background up to 700 nm could be resolved with the probe. The outline of the cross section of the lens is also visible. The probe may image across this whole area, indicating that the field of view is really only limited by the size of the waveguide which in this case is 100 microns by 100 microns. Those skilled in the art will appreciate that the same techniques may be used to create waveguides with different sizes and hence different FOVs.

In an exemplary application, the waveguide and lens described herein may be implanted in a live animal for deep brain imaging with unprecedented resolution and high field of view.

Optogenetic Excitation Embodiment

In an alternative embodiment, the probe described herein may be adapted to address the above challenges relating to optogenetic excitation by providing an on-chip platform for optogenetic applications that is wavelength insensitive and has an ability to tailor the diffraction of light exiting the probe. In order to overcome the strong diffraction of light, the SU-8 waveguide is monolithically integrated with a lens as described above. The lens is designed to collimate or focus the beam depending on its geometry. In order to overcome wavelength sensitivity of traditional platforms, a wavelength insensitive 45 degrees mirror is monolithically integrated (FIG. 7A) instead of using traditional gratings for directing light out of the waveguide and into the brain.

Figure 7A:
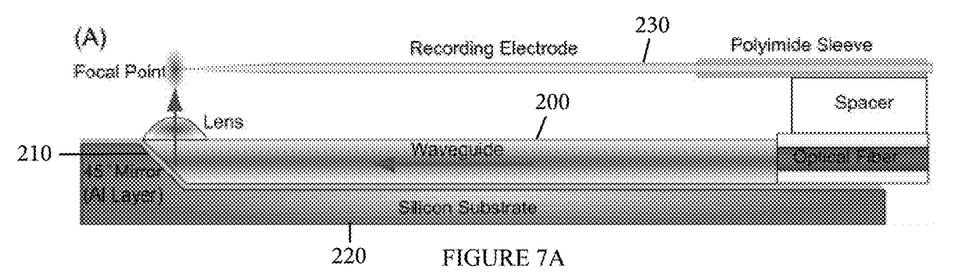
FIG. 7A illustrates a schematic of the probe which includes waveguides, lens, and an electrode.
Figure 7B:
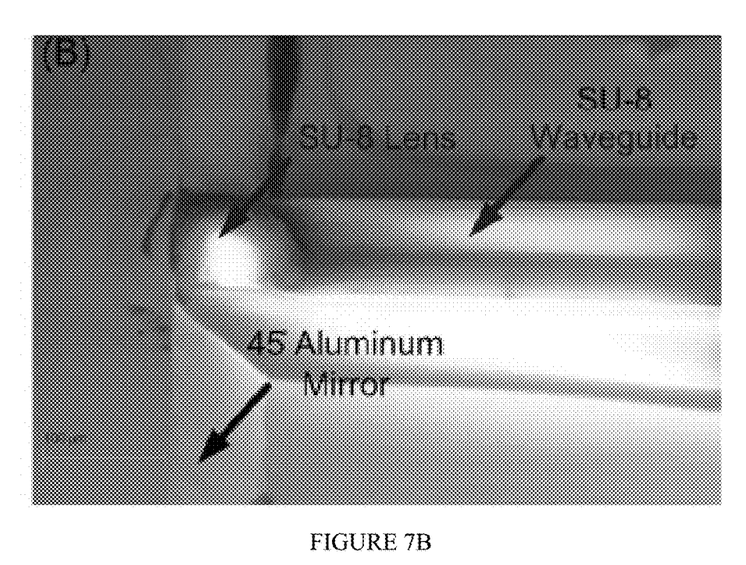
FIG. 7B illustrates an SEM image of the lens, waveguide and the mirror on the tip of an optical probe.

As in the above embodiment, the probe structure of FIG. 7A was based on SU-8 as a guiding material, though it should be understood that SU-8 is not the exclusive polymer suitable for the disclosed technology. A waveguide mold 200 was defined using wet etching of silicon using a silicon dioxide mask patterned with 45° angle with respect to the silicon substrate edge and an aluminum layer 210 acting as a mirror is deposited on the silicon substrate 220. A lens mold was made using isotropic etching of the fused silica substrate and then aligned to the silicon substrate 220. SU-8 2025 is flowed into the waveguide mask+lens mold (both on the same substrate) by decreasing its viscosity and using capillary forces via careful temperature control of the substrate. The resulting structure is shown in FIG. 7B. Cross sectional dimensions of $100 \times 100$ $\mu m^2$ are chosen to ensure low dispersion as well as low interaction of the mode with the aluminum layer (COMSOL simulations show losses <<0.1 dB/cm). The lens numerical aperture of 0.25, focal length of about 175 μm and spot size of about 1.6 μm are achieved considering the lens dimensions.

Figure 8A:
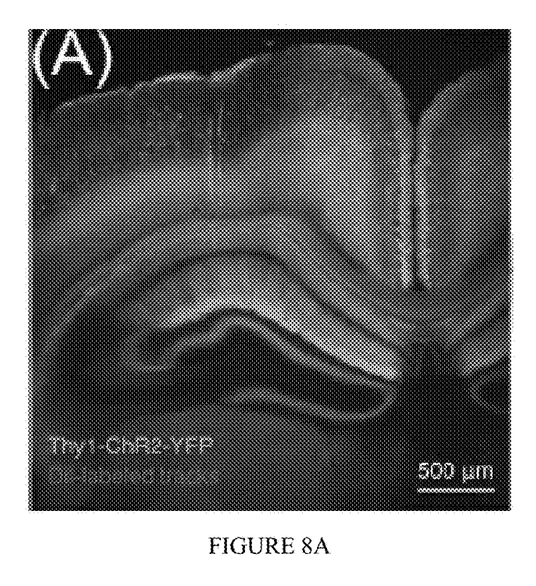
FIG. 8A illustrates a fluorescence micrograph of a coronal brain section showing visual cortex (V1) and hippocampus (CA1).
Figure 8B:
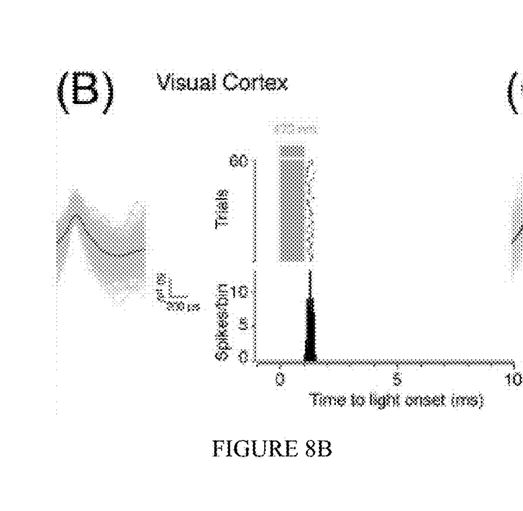
FIGS. 8B and 8C illustrate optogenetic activation of genetically defined pyramidal neurons in the visual cortex at 0.6 mm depth (FIG. 8B) and CA1 at 1.2 mm depth (FIG. 8C).
Figure 8C:
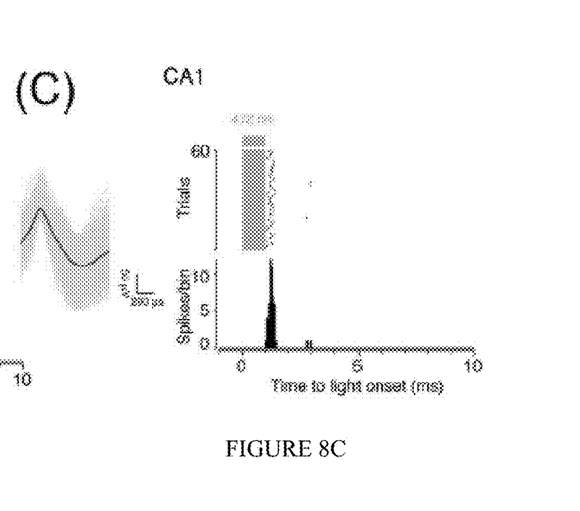

FIG. 8 illustrates that waveguide illumination drives localized spikes in anesthetized mice. FIG. 8A illustrates a fluorescence micrograph of a coronal brain section showing visual cortex (V1) and hippocampus (CA1). The tracks (DiI) mark the travel of the waveguide and tungsten electrode. The label shows ChR2-YFP expression in pyramidal neurons. FIGS. 8B and 8C illustrate optogenetic activation of genetically defined pyramidal neurons in the visual cortex at 0.6 mm depth (FIG. 8B) and CA1 at 1.2 mm depth (FIG. 8C). The single unit spikes on the left were recorded with a tungsten electrode. Individual traces are shown in light shading and the mean spike waveform is shown in dark shading. On the right a spike raster and peri-stimulus time histogram (PSTH) for the light activated neuron shown at the left panel are aligned to light onset. The light pulse has a wavelength of 472 nm, power of ~2 mW on the device, a pulse width of 1 ms, a frequency of 10 Hz, and a pulse number of 60. As illustrated, the first-spike latency is 1.3 ms (visual cortex) and 1.3 ms (CA1), while the first-spike jitter is 0.1 ms (visual cortex) and 0.2 ms (CA1).

FIG. 8 further illustrates neural excitation in vivo at a wavelength of 472 nm by combining the platform with a recording electrode 230 (FIG. 7A). The optical probe is aligned to a tungsten electrode (1 MΩ, 1 μm tip, World Precision Instruments) using optical adhesive and is positioned right above the waveguide with a 150 μm spacer, facing lens focal plate. The integrated optical probe and the recording electrode is inserted in an anesthetized transgenic mouse (Thy 1-ChR2-YFP). In this mouse line, a population of pyramidal cells express the light-sensitive ion channel, ChR2. A small craniotomy ($0.8 \times 0.8$ $mm^2$) was performed above the left visual cortex (V1, 2.4 mm posterior, 2.1 mm lateral, from bregma). In order to visualize the region in the mouse brain where the probes are inserted, the probe surface is coated with Vybrant Di-I cell labeling solution (see FIG. 8A). Neural activity was recorded using Digilynx (Neuralynx) sampled at 32 KHz. Thresholded spike waveforms were manually sorted into clusters offline based on peak amplitude and waveform energy using the MClust software, evaluated for refractory period violations to yield putative single units. During the experiment, the probe was lowered through the neocortex and all the way until the hippocampus (FIG. 8A) to search for light-activated neurons. It was discovered that the probes could be inserted and lowered without excessive tissue damage or damage to the probes. FIGS. 8B and 8C show two example neurons recorded, one from visual cortex and another one from the hippocampus. Alignment to the 1 ms light pulse revealed low latency (~1.3 ms), jitter (0.1-0.2 ms) and reliable (p=0.96) spiking. Increasing light-intensity above the threshold did not yield additional spikes due to secondary activation by other neurons, indicating a higher degree of specificity that is not observed with conventional optical fibers.

The disclosed platform addresses beam diffraction in integrated waveguides for imaging, optogenetic, and other applications that will be apparent to those skilled in the art. The device enables ultra-high resolution imaging down to a few microns. Although the lens is used to focus, the platform enables arbitrary geometries for the lens and also could enable neural excitation at a variety of focal points as well as a variety for beam collimation and beam shaping patterns. The demonstrated platform also could form a path for deep high resolution neural excitation in a variety of modalities requiring high bandwidth operation.

Cascaded Lenses Embodiments

Figure 9:
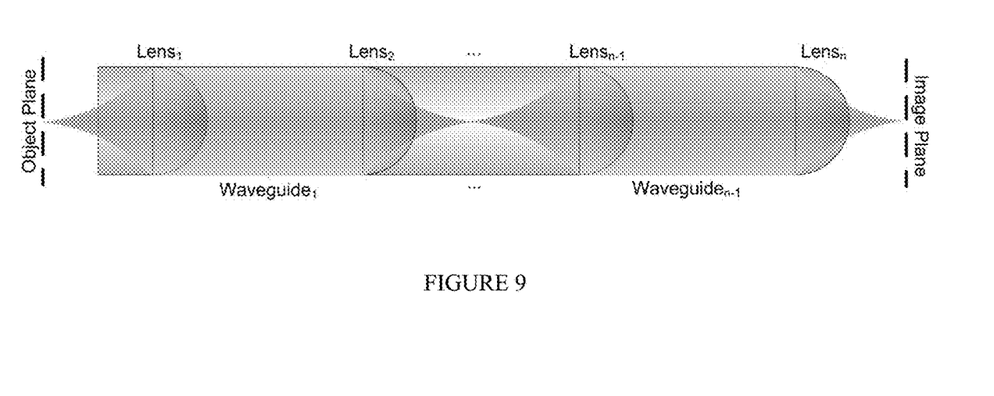
FIG. 9 illustrates an embodiment including a cascade of micro-lenses and extended waveguide.

FIG. 9 illustrates an embodiment including a cascade of micro-lenses ($Lens_1$ to $Lens_n$) and extended waveguide ($Waveguide_1$ to $Waveguide_{n-1}$) that can be used to increase the length of the probe. As illustrated in FIG. 9, the cascade of micro-lenses is placed at intervals along the integrated waveguide so as to increase a length of the integrated waveguide. In the configuration of FIG. 9, each of the lens/waveguides works like a half period of the Graded Refractive Index (GRIN) lens. Some of these micro-lenses can be combined with some other lenses for aberration correction. In this case, a very small lens probe with a very long waveguide is provided. This is currently impossible to do with the GRIN lenses. Also, the aberration correction on each step (lens level) is very hard to do in the GRIN lenses.

This embodiment thus achieves a higher quality image with a better resolution and larger field of view than is available with conventional GRIN lenses.

Figure 10:
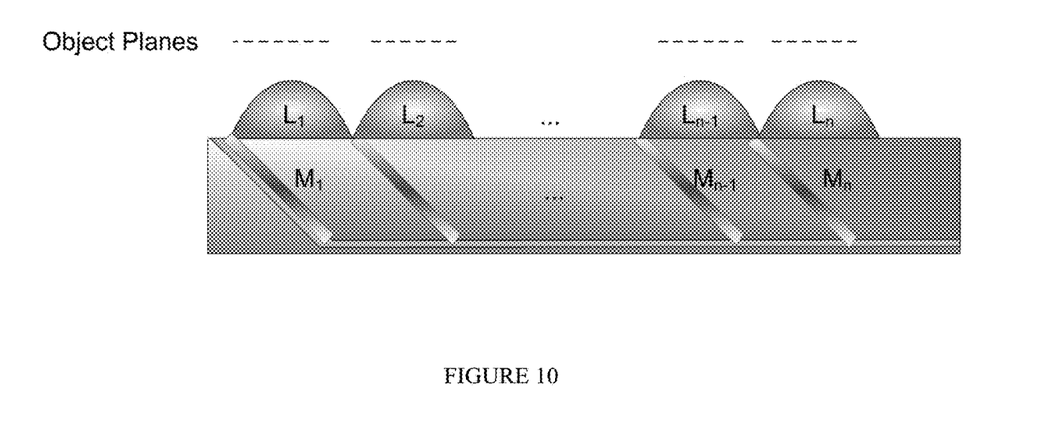
FIG. 10 illustrates an embodiment where a cascade of lenses and mirrors are used on the same waveguide to image at different depths.

FIG. 10 illustrates an embodiment where a cascade of lenses $L_1$ to $L_n$ and mirrors $M_1$ to $M_n$ are used on the same waveguide to image at different depths. As illustrated in FIG. 10, a cascade of micro-lenses and corresponding mirrors inclined 45° with respect to the integrated waveguide are configured so as to deflect incident light by approximately 90° into a corresponding micro-lens. Replacing mirrors by the filters and utilizing wavelength dividing/multiplexing techniques in this case can significantly decrease the background noise and increase the contrast.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present disclosure is not limited to the particular examples and implementations disclosed herein, but is intended to cover modifications within the spirit and scope thereof as defined by the appended claims and any and all equivalents thereof.

What is claimed:

1. A probe structure, comprising:
   a substrate;
   a waveguide disposed on the substrate; and
   a micro-lens extending from the waveguide, wherein the waveguide and the micro-lens are formed together as a single integrated structure, wherein the micro-lens is one of a plurality of micro-lenses located at intervals along the waveguide, and wherein each of the plurality of micro-lenses and corresponding portions of the waveguide are configured as a half period of a Graded Refractive Index (GRIN) lens.

2. The probe structure of claim 1, wherein a tip of the waveguide is inclined 45° and is coated with an aluminum layer that deflects incident light by approximately 90° into the micro-lens.

3. The probe structure of claim 2, wherein a reflective surface of the aluminum layer is characterized as being wavelength-insensitive.

4. The probe structure of claim 1, wherein the micro-lens is formed of polymers with different refractive indices from 1.3 to 1.7.

5. The probe structure of claim 1, wherein the micro-lens and the waveguide comprise a same polymeric material.

6. The probe structure of claim 1, wherein the micro-lens has a principal axis that is substantially perpendicular to a longitudinal axis along the length of the waveguide.

7. The probe structure of claim 1, further comprising a second lens that at least partially surmounts the micro-lens.

8. The probe structure of claim 1, wherein the plurality of micro-lenses comprise a plurality of cascaded micro-lenses with corresponding mirrors inclined 45° with respect to the waveguide to deflect incident light by approximately 90° into a corresponding micro-lens of the plurality of cascaded micro-lenses.

9. The probe structure of claim 1, wherein the waveguide and the micro-lens are formed together, using capillary forces, as the single integrated structure.

10. The probe structure of claim 1, wherein the waveguide and the micro-lens are configured as a probe structure.

* * * * *